United States Patent [19]
Mao et al.

[11] Patent Number: 6,149,278
[45] Date of Patent: Nov. 21, 2000

[54] WAVELENGTH INDEPENDENT VARIABLE OPTICAL ATTENUATOR

[75] Inventors: Hongwei Mao; Yi-Xin Chen, both of San Jose; Kok Wai Chang, Sunnyvale, all of Calif.

[73] Assignee: E-Tek Dynamics, San Jose, Calif.

[21] Appl. No.: 09/342,891

[22] Filed: Jun. 29, 1999

[51] Int. Cl.$^7$ ........................................... G02B 5/08
[52] U.S. Cl. ................. 359/862; 359/201; 359/857; 385/140
[58] Field of Search ..................... 359/201, 556, 359/857, 862; 385/140

[56] References Cited

U.S. PATENT DOCUMENTS

| | | |
|---|---|---|
| 4,192,573 | 3/1980 | Brown, Jr. .............................. 359/365 |
| 4,516,827 | 5/1985 | Lance et al. . |
| 4,591,231 | 5/1986 | Kaiser et al. . |
| 4,989,938 | 2/1991 | Tamulevich . |
| 5,087,122 | 2/1992 | Ostrander et al. . |
| 5,325,459 | 6/1994 | Schmidt . |
| 5,677,977 | 10/1997 | Smith . |
| 5,745,634 | 4/1998 | Garrett et al. . |

*Primary Examiner*—Darren Schuberg
*Attorney, Agent, or Firm*—Blakely, Sokoloff, Taylor & Zafman LLP

[57] ABSTRACT

The invention provides an optical attenuator having a pair of substantially parallel mirrors that attenuate an optical signal based, at least in part, on the rotation angle of the mirrors. When the pair or mirrors is in a predetermined position, an input optical signal is directed from an input port to an output port with a minimum insertion loss. As the pair of mirrors is rotated, the optical signal is shifted parallelly, which provides increased insertion loss and an attenuated signal at the output port. The pair of mirrors can be rotated, for example, with a stepper motor, or other device.

16 Claims, 4 Drawing Sheets

WAVELENGTH INDEPENDENT VARIABLE OPTICAL ATTENUATOR

FIELD OF THE INVENTION

The invention relates to optical communications. More particularly, the invention relates to a variable attenuator for optical communications.

BACKGROUND OF THE INVENTION

Optical attenuators are used to optimize the optical power of signals at key points in optical communications networks. For example, in networks having Erbium Doped Fiber Amplifiers (EDFAs), optical attenuators are used between stages of EDFAs to provide constant gain. In Wavelength Division Multiplexed (WDM) systems, optical attenuators are used to adjust optical power of "added" laser signals to match the signal strength of other channels within the network. Optical attenuators can also be used to set signal strength within the range of a particular receiver.

In order to optimize signal strength in fiber optic networks, fiber optic attenuators have been developed. For example, U.S. Pat. No. 5,087,122 issued to Ostrander, et al. (the '122 patent) discloses a blocking beam type attenuator. The '122 patent discloses a vane-line mechanical blocker that is gradually rotated in to a collimated beam to cause light attenuation. The attenuator of the '122 patent provides low insertion loss, low polarization dependent loss, and low wavelength dependent loss.

However, compact size and insensitivity to changes in environmental conditions are desired for most fiber optic components. The attenuator of the '122 patent is not compact in size. Further, the attenuator of the '122 patent is sensitive to mechanical shock and to temperature variations. Thus, the attenuator of the '122 patent requires precise control and special package design, which increases manufacturing costs. What is needed is an improved attenuator for use with fiber optic communications signals.

SUMMARY OF THE INVENTION

An optical attenuator is described. The optical attenuator includes a pair of substantially parallel mirrors. The mirrors attenuate an optical signal based, at least in part, on an angle of rotation from a predetermined position. The mirrors provide attenuation over a large angle of rotation. In one embodiment, the mirrors are rotated by a stepper motor. In one embodiment, the attenuator includes a beam splitter and a light monitor to monitor the intensity of an optical signal. The light monitor can be used to control the rotation angle of the mirrors.

DESCRIPTION OF THE DRAWINGS

The invention is illustrated by way of example, and not by way of limitation in the figures of the accompanying drawings in which like reference numerals refer to similar elements.

DETAILED DESCRIPTION

An optical attenuator is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The invention provides an optical attenuator having a pair of substantially parallel mirrors that attenuate an optical signal based, at least in part, on the rotation angle of the mirrors. When the pair or mirrors is in a predetermined position, an input optical signal is directed from an input port to an output port with a minimum insertion loss. As the pair of mirrors is rotated, the optical signal is shifted parallelly, which provides increased insertion loss and an attenuated signal at the output port. The pair of mirrors can be rotated, for example, with a stepper motor, or other device.

Figure 1:
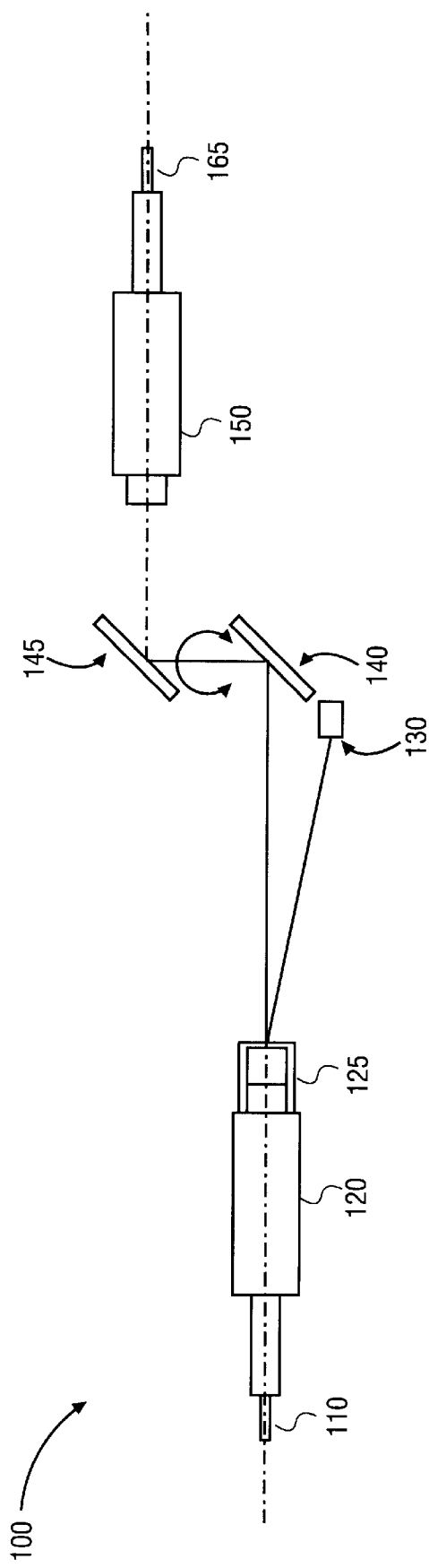
FIG. 1 illustrates one embodiment of a wavelength independent variable optical attenuator having substantially parallel mirrors.

FIG. 1 illustrates one embodiment of a wavelength independent variable optical attenuator having substantially parallel mirrors. Because the output beam is parallel to the input beam when a collimated beam is reflected twice by a pair of parallel mirrors, the coupling loss for the collimator is insensitive to lateral offset as compared with angular misalignment. Thus, the attenuator provides smooth tuning and low sensitivity to changes in environmental conditions.

Attenuator 100 receives an optical signal via optical fiber 110. Optical fiber 110 directs the optical signal to collimator 120. Collimator 120 collimates the optical signal. In an alternative embodiment, attenuator 100 receives collimated signal and does not include collimators.

In one embodiment, attenuator 100 includes beam splitter 125 and light monitor 130. Beam splitter can be, for example, a holographic beam splitter. Beam splitter 125 directs a small percentage (3% to 5%) of the optical signal received to light monitor 130. Any percentage of the input signal can be directed to light monitor 130. In an alternative embodiment, beam splitter 125 and/or light monitor 130 are in a different location in attenuator 100 or not included in attenuator 100. For example, beam splitter 125 and light monitor 130 can be used to monitor the light near the output of attenuator 100.

In an embodiment not illustrated, attenuator 100 can have multiple beam splitters and/or light monitors. For example, in addition to beam splitter 125 and light monitor 130 that monitor the intensity of the input signal, an additional beam splitter axially aligned with collimator 150 can be placed between mirror 145 and collimator 150 to direct a small percentage of the output signal to a light monitor. The additional light monitor can provide an indication of the intensity of the output signal.

Mirrors 140 and 145 are substantially parallel mirrors that can be rotated by a motor or other device (not shown in FIG. 1) to provide attenuation of the optical signal(s) input to attenuator 100. In one embodiment, mirrors 140 and 145 are rotated by a stepper motor. Attenuation of the optical signal (s) through rotation of mirrors 140 and 145 is described in greater detail below. Rotation of mirrors 140 and 145 parallelly shift the optical signal thereby changing the insertion loss of attenuator 100 and providing an attenuated optical signal to collimator 150. In other words, rotation of mirrors 140 and 145 changes the alignment of the optical signal with respect to collimator 150, which decreases the intensity of the signal received by collimator 150.

In one embodiment, feedback from light monitor 130 is provided to the motor or other device that rotates mirrors 140 and 145 to control the rotation angle of mirrors 140 and 145. Feedback from light monitor 130 to the motor allows attenuator 100 to provide an approximately constant output intensity for signals that do not provide constant intensity caused, for example, by changing environmental conditions.

The optical signal is reflected by mirror 145 to collimator 150. The intensity of the optical signal received by collimator 150 is determined, at least in part, by the alignment of the optical signal with collimator 150, which can be varied by rotation of mirrors 140 and 145. Because the angular rotation for attenuation is large, the precision of the components of attenuator 100 is greatly reduced as compared to other attenuator configurations, for example, vane-type attenuators. Collimator 150 focuses the received signal on optical fiber 165. Optical fiber 165 carries the attenuated signal from attenuator 100.

Figure 2:
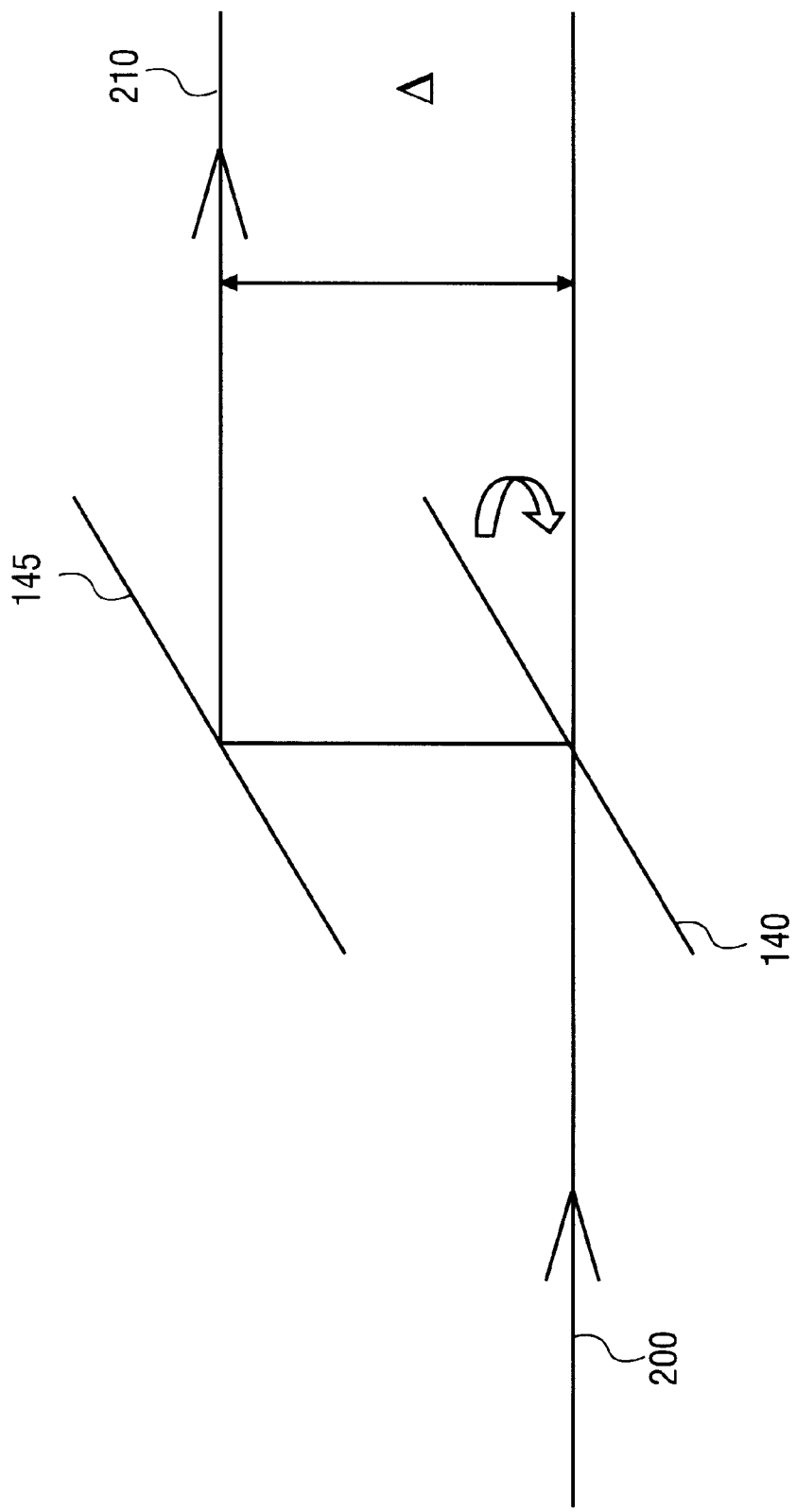
FIG. 2 illustrates a pair of substantially parallel mirrors suitable for use in the attenuator of FIG. 1.

FIG. 2 illustrates a pair of substantially parallel mirrors suitable for use in the attenuator of FIG. 1. Mirrors 140 and 145 are substantially parallel and provide minimal insertion loss when placed in a predetermined position. When in the predetermined position, parallel mirrors 140 and 145 operate to shift the position of incoming optical signal 200 from alignment with an input collimator (not shown in FIG. 2) to the position of outgoing optical signal 210, which is aligned with an output collimator (not shown in FIG. 2).

In one embodiment, when mirrors 140 and 145 are in the predetermined position, mirrors 140 and 145 are at an angle of 45° with respect to the input and output collimators. As mirrors 140 and 145 are rotated, and maintained parallel to each other, the angle of the mirrors with respect to the collimators changes slightly.

When parallel mirrors 140 and 145 are rotated away from the predetermined position, outgoing optical signal 210 is shifted so as to be less optimally aligned with the output collimator. The shift caused by the rotation of mirrors 140 and 145 increases the insertion loss, which attenuates the input optical signal.

In one embodiment, the shift caused by rotation of mirrors 140 and 145 is a function of the rotation angle of mirrors 140 and 145. In one embodiment, the amount of shift is defined by $\Delta = 2d \cos \Theta$, where $\Delta$ is the amount of shift, d is the distance between the mirrors, and $\Theta$ is the angle of rotation. In one embodiment d is 2 mm; however, other distances between the mirrors can also be used. Other shifting functions can also be implemented.

Increasing the amount of shift ($\Delta$) increases the insertion loss caused by the attenuator, which increases the attenuation of the input signal. Because attenuation is caused by rotation of parallel mirrors over a large angle, the invention provides precise control at low cost as compared to linear sliding of a blocking element. Because mirrors can be chromatic distortion free optical components, the attenuator is wavelength independent.

Figure 3:
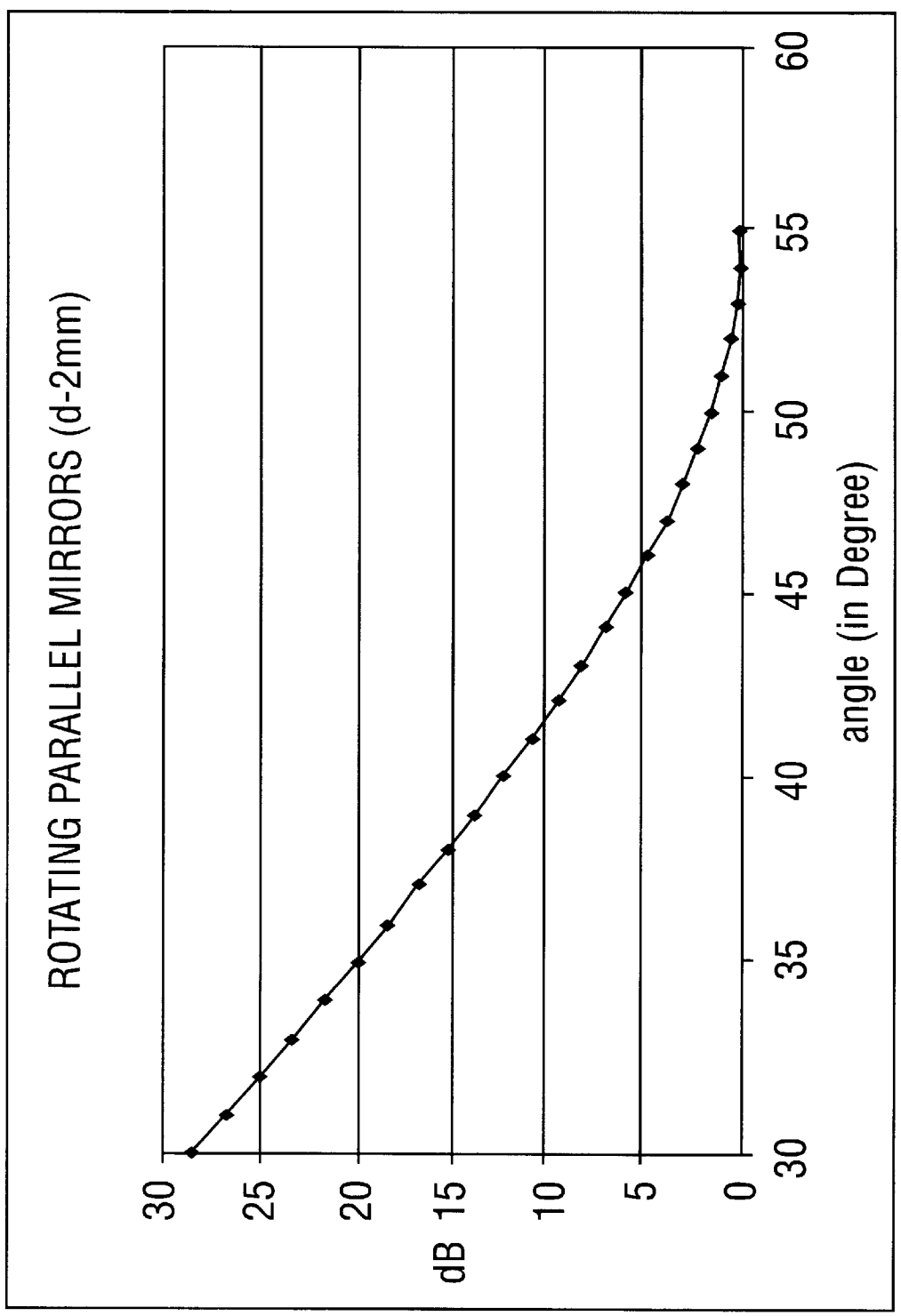
FIG. 3 represents the attenuation of optical signals as function of rotation angle of a pair of parallel mirrors according to one embodiment of an attenuator having parallel mirrors.

FIG. 3 represents the attenuation of optical signals as function of rotation angle of a pair of parallel mirrors according to one embodiment of an attenuator having parallel mirrors. The attenuation line of FIG. 3 is for an attenuator having a distance (d) of 2 mm between two substantially parallel mirrors. Different attenuation curves are provided by pairs of parallel mirrors having different distances because the offset caused by the mirrors is different causing different insertion loss for various angles of rotation.

According to FIG. 3, the attenuator provides 0 dB of attenuation at a predetermined position (e.g., 55°). In alternative embodiments, the predetermined position can be defined as a different position.

Figure 4:
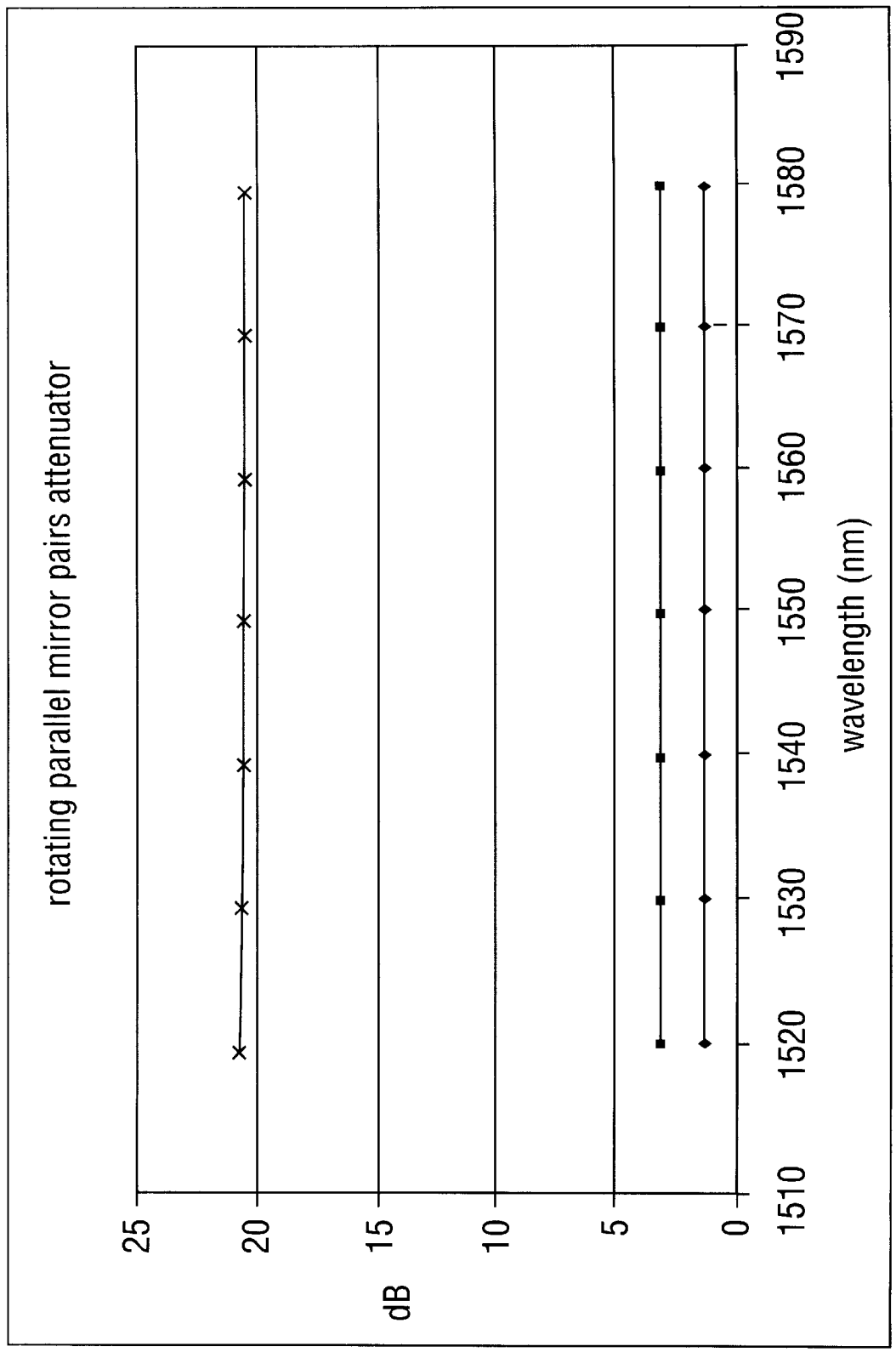
FIG. 4 is a set of wavelength dependent loss curves for an attenuator having the tuning curve of FIG. 3.

FIG. 4 is a set of wavelength dependent loss curves for an attenuator having the tuning curve of FIG. 3. The curves of FIG. 4 correspond to wavelength dependent attenuation at 20 dB, 3 dB, and minimum insertion positions.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An attenuator comprising a pair of substantially parallel mirrors that attenuate an optical signal based, at least in part, on an angle of rotation, wherein the mirrors provide attenuation over a large angle of rotation.

2. The attenuator of claim 1 further comprising a stepper motor coupled to the mirrors, the stepper motor to rotate the mirrors.

3. The attenuator of claim 1 further comprising:
   a holographic beam splitter optically coupled to an input port;
   an light monitor optically coupled to the holographic beam splitter, the light monitor to receive a monitoring signal indicating an intensity of the optical signal received at the input port.

4. The attenuator of claim 3 further comprising a stepper motor coupled to the light monitor to control rotation of the mirrors.

5. The attenuator of claim 1 wherein the pair of substantially parallel mirrors are separated by a distance of approximately 2 millimeters.

6. An apparatus comprising:
   means for parallelly shifting an optical signal; and
   means for rotating the means for parallelly shifting the optical signal to attenuate the optical signal to provide an attenuated optical signal.

7. The apparatus of claim 6 further comprising means for monitoring an intensity of the optical signal.

8. The apparatus of claim 7 wherein the means for monitoring the intensity of the optical signal controls the means for rotating to control the attenuation of the optical signal.

9. A method for attenuating an optical signal, the method comprising:
   receiving an optical signal; and
   rotating a pair of substantially parallel mirrors to attenuate the optical signal.

10. The method of claim 9 wherein the mirrors are rotated by a stepping motor.

11. The method of claim 10 further comprising:
   monitoring an intensity of the optical signal; and
   controlling a rotation angle of the mirrors based, at least in part, the intensity of the optical signal.

12. An optical attenuator comprising:

an input port to collimate an optical signal;

a first rotatable mirror, the first rotatable mirror to reflect the optical signal from the input port;

a second rotatable mirror substantially parallel to the first rotatable mirror, the second rotatable mirror to reflect the optical signal from the first rotatable mirror; and an output port to receive the optical signal from the second rotatable mirror and to provide an output optical signal;

wherein the first rotatable mirror and the second rotatable mirror operate to parallelly shift the optical signal to provide attenuation of the optical signal between the input port and the output port.

13. The optical attenuator of claim 12 further comprising a stepper motor coupled to the first rotatable mirror and to the second rotatable mirror to rotate the mirrors to parallelly shift the optical signal.

14. The optical attenuator of claim 12 further comprising:

a beam splitter optically coupled to the input port; and a light monitor to receive a monitoring beam from the beam splitter.

15. The optical attenuator of claim 14 wherein the light monitor provides feedback to control rotation of the mirrors.

16. The optical attenuator of claim 12 wherein the first rotatable mirror and the second rotatable mirror are separated by approximately 2 millimeters.

* * * * *